April 5, 1960   J. H. STIVERS   2,931,372
BOAT WASH STATION
Filed Oct. 14, 1958   3 Sheets-Sheet 1
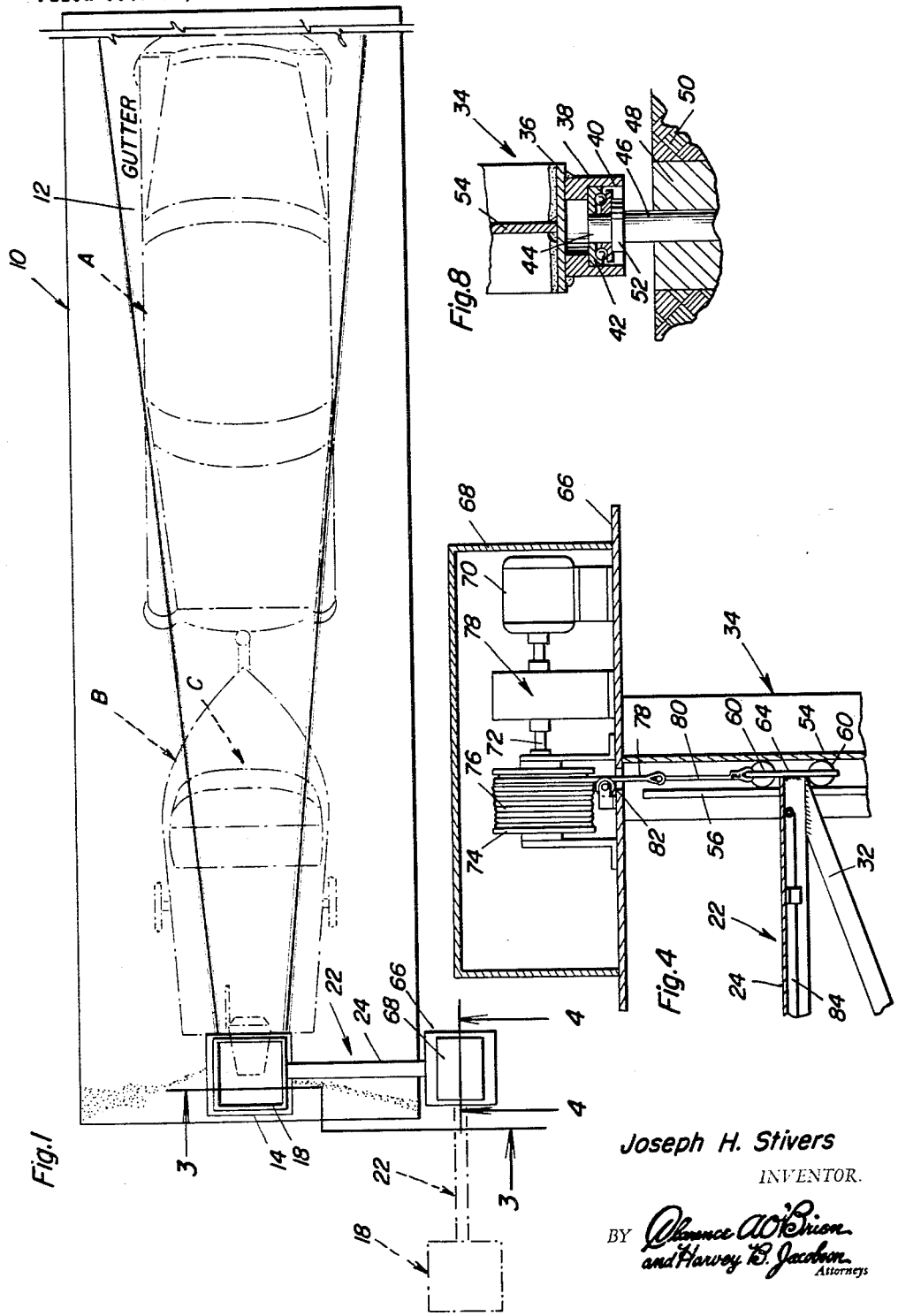
Joseph H. Stivers
INVENTOR.

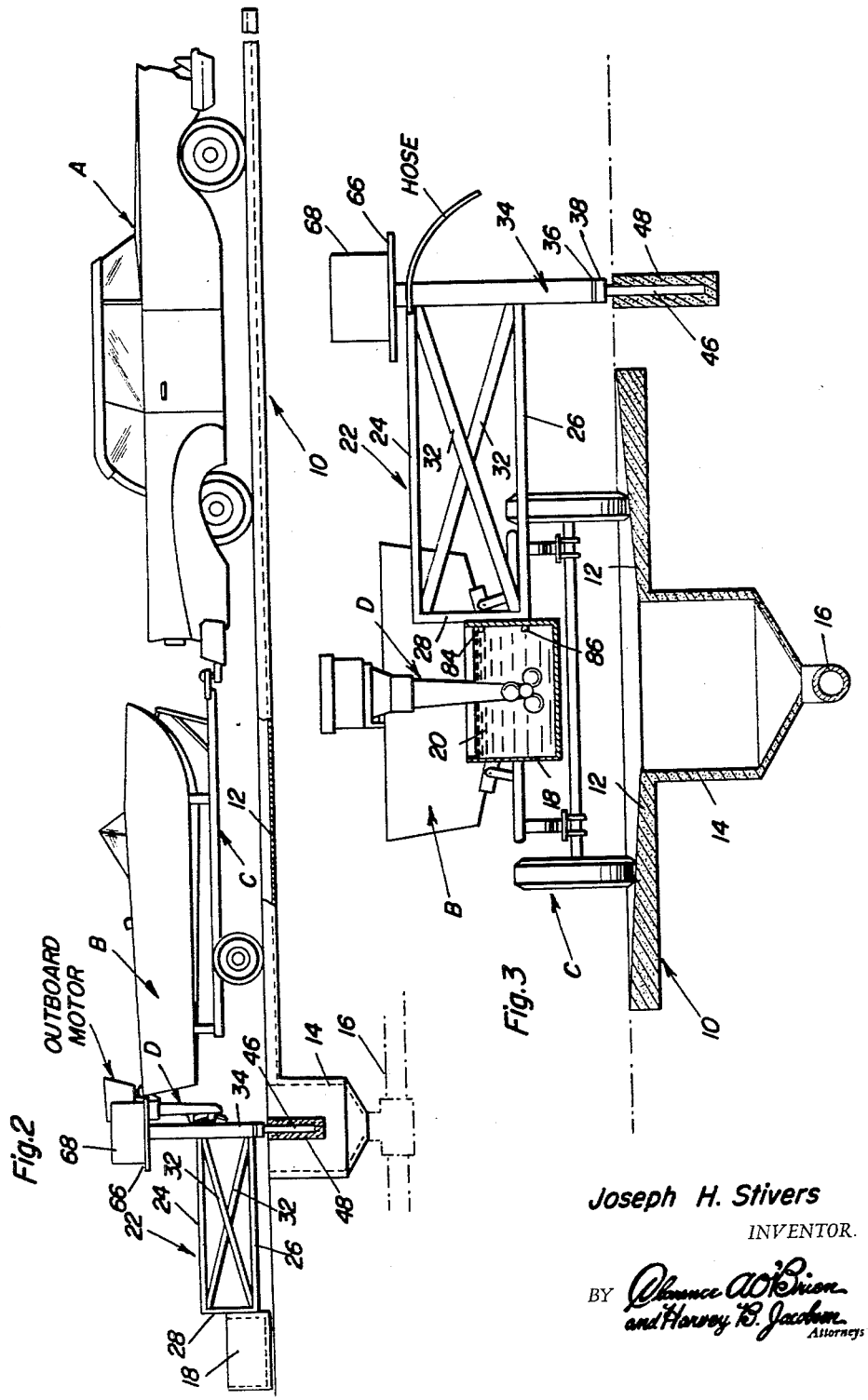

April 5, 1960  J. H. STIVERS  2,931,372
BOAT WASH STATION
Filed Oct. 14, 1958  3 Sheets-Sheet 3
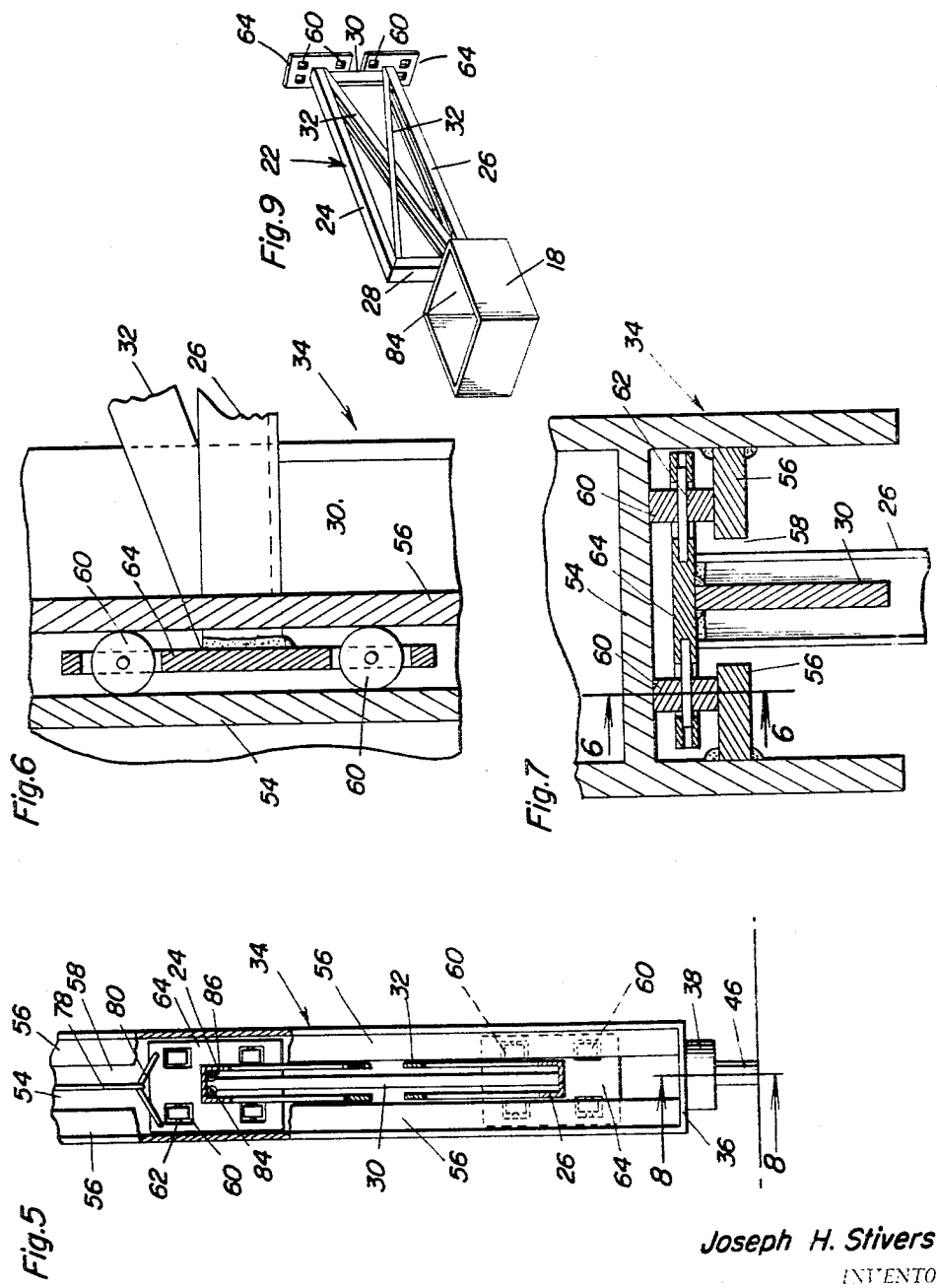
Joseph H. Stivers
INVENTOR.

United States Patent Office
2,931,372
Patented Apr. 5, 1960

2,931,372

BOAT WASH STATION

Joseph H. Stivers, Pasadena, Tex.

Application October 14, 1958, Serial No. 767,176

3 Claims. (Cl. 134—119)

The present invention relates to certain new and useful improvements in a novel and practical structure which is expressly constructed and adapted to conveniently, expeditiously and effectually wash a trailer supported boat.

It is submitted that there has long existed the recognized problem of how best to wash and clean a boat with the outboard motor mounted thereon in a ready-to-operate position and, particularly, where the motor equipped boat is attached to a wheel supported or an equivalent trailer. The problem, as herein taken into account, poses the question, how to achieve desirable end results with a minimum expenditure of time and labor. It follows that the instant concept seeks to solve the problem and to do so through the medium of simple and practical structural means which makes it possible to permit one to drive the trailer while attached to an automobile onto a foundation or specially constructed driveway and to do the job with the least possible difficulty and then drive off, much in the manner followed when handling a so-called car wash job.

It is within the scope of the over-all concept to appropriate the invention for use in a public wash station, garage or the like, or, alternatively, to construct the station for private use at one's seaside cottage or shore home. However, the principal incentive which gave rise to the ideas under advisement has had to do with the provision of a simple and economical and efficient boat wash station primarily for use in salt water areas along the coast where frequent cleaning of the boat and the motor is thought to be advisable and in fact is more or less a now accepted practice.

Briefly, in carrying out the inventive idea, a concrete slab has been used as a firm and reliable foundation. This is relatively long and reasonably narrow and is hereing referred to either as a driveway, runway, foundation or the like. An experimental construction has involved the use of a concrete driveway say 42 feet long and 15 feet wide, allowing for a 17 feet area for the automobile, and a 25 feet area, more or less, for the motor-equipped trailer supported boat with the trailer hitched, of course, to the automobile.

The concrete or equivalent driveway is provided with a trough-like centrally disposed gutter. The major portions of the driving surface are substantially flat to allow the automobile and trailer to be driven on and off and temporarily parked so that the trailer and boat are directly above the wash water accumulating gutter. A pit or trap is arranged at the widest and deepest end of the gutter and this in turn is connected with a drain pipe leading to a suitable place of disposal.

A tank is provided with running fresh water and is so constructed and arranged that the lower or propeller equipped end of the outboard motor may be immersed in the running water and flushed in a satisfactory manner. To this end the tank is supported on a simple and suitable crane allowing the tank to be swung toward and from the pit or trap and raised and lowered relative to the propeller of the outboard motor.

Other objects, features and advantages will become more readily apparent from the following description and the accompanying drawings.

In the drawings, wherein like numerals are employed to designate like parts throughout the same:

Fig. 1 is a plan view, somewhat diagrammatic in character, showing the over-all invention and illustrating, in phantom or dotted lines the temporarily stationed position of the automobile and boat and trailer.

Fig. 2 is a side elevational view with portions broken away and shown in section.

Fig. 3 is an exaggerated section taken approximately on the plane of the irregular line 3—3 of Fig. 1, looking in the direction of the arrows.

Fig. 4 is a similar section on an enlarged scale taken on the plane of the line 4—4 of Fig. 1.

Fig. 5 is a section on the vertical line 5—5 of Fig. 3.

Fig. 6 is a fragmentary section on the line 6—6 of Fig. 7.

Fig. 7 is a horizontal fragmentary sectional and elevational view through the post or upright of the crane.

Fig. 8 is a section on an enlarged scale on the line 8—8 of Fig. 5.

Fig. 9 is a perspective view, on a small scale, of the tank and suspending arm, significant components of the motor driven crane.

With reference now to Figs. 1 and 2 the concrete or equivalent foundation, runway or driveway, is denoted by the numeral 10. As before stated this may be of an area or size suitable for any given occasion. The experimental device, as before explained is 42 feet long and 15 feet wide to accommodate an automobile A, say 17 feet long, a boat B, supporting trailer C and the outboard ready-to-operate or mounted motor D. While the outer marginal areas of the top surface of the driveway may be said to be flat and in a horizontal plane, the median portion is dished and formed with a relatively shallow but satsifactorily formed generally V-shaped gutter. This is accomplished by beveling or inclining the walls or surfaces 12 in the manner shown best in Fig. 3, and this gutter or trough channels the wash water toward and empties it in a suitable concrete pit or trap 14. The trap is communicatively connected with a drain pipe 16.

The small crane is made up of several parts and its primary purpose is to adjustably support the retractible tank 18. This tank is of suitable proportion and depth to permit the propeller end of the outboard motor to be immersed in the water 20 contained therein in the manner seen in Fig. 3. The tank is supported on the outer end of an arm 22. More specifically this arm comprises a generally rectangular frame made up of horizontal channel irons 24 and 26 at the top and bottom and vertical channel irons 28 and 30. Suitable diagonal braces 32 may be provided if desired. In any event the tank is supported on the vertical frame member 28 in the manner shown. The other vertical frame member is adjustably mounted on a swivelly mounted post. Specifically the post 34 comprises a vertical I-beam, the lower end 36 (Fig. 8) of which is provided with a fixed depending collar 38 recessed at the bottom as at 40 and containing a roller bearing 42 mounted on the upper end 44 of an anchoring pin 46 anchored in a concrete base or the like 48 in the ground 50. A flange or shoulder collar 52 is provided to accommodate the roller bearing. The web 54 of the post provides one member of a track arrangement which is seen in Fig. 7. Vertical rails 56 are welded in place and in spaced parallel relation to the web and these rails and the web provide a space 58 and define two tracks for freely rotatable rollers 60 mounted on axles or pins 62 carried by head plates 64 on the frame members in the manner shown. A plate 66 is supported atop (Fig. 4) the I-beam and carries a housing 68 for the operating means. This means comprises a suitable electric motor 70 driving a shaft 72 operating a winding drum 74 for a lifting cable 76 by way of gearing (not detailed) contained in a gear box 78. The lower portion 78 of the cable is connected with a sling 80 which provides a balanced or evener and is connected to the uppermost roller plate for purposes of raising and lowering the entire gate-like frame. The numeral 82 designates a simple guide roller for the cable.

The numerals 84 and 86 (Fig. 5) designate pipes, hose lines or similar conduits for delivering water to and returning it from the tank thus to provide constant circulation of fresh water.

In actual practice, the automobile and the trailer carrying the boat may be driven from left to right onto the concrete foundation or driveway 10. Manifestly, at this time the gate or arm supported tank 18 forming a part of the aforementioned motorized crane will, of course, be swung to an out-of-the-way position. If the installation of the construction is such that available room would prevent this left to right approach, the trailer could, of course, be backed into position from the right hand end, that is from right to left in Fig. 2. Further concerning this aspect of the mode of use and operation, much will depend on the place where the invention is installed. That is to say, it is within the purview of the invention to arrange or install it in an enclosure such as a garage, a wash station, or on one's private premises. It stands to reason that the preferred mode of installation is that wherein the automobile and trailer are driven on at one end and off at the other. This is one of the reasons for utilizing the swivelly mounted post 34 as the upright means in the crane.

An important aspect of the "crane" aside from the swivelly mounted post 34 and the tank carrying swingable frame 22 is the fact that the frame may be vertically raised and lowered. After the vehicles have been "parked" for service on the foundation or driveway, the tank is swung in at the low level, until it is just above the pit 14. Then the motor 70 is operated to reel the cable 76 on the reel 74 lifting the frame and tank up to the desired level whereupon the propeller end of the outboard motor D is immersed for flushing. The hose lines which are employed to maintain circulation of clear water in the tank will of course vary in construction depending upon the facilities at hand. Once the outboard motor has been flushed and cleansed the services may be extended to hand wash the boat B; or for that matter, to give the car A a "once-over."

Where the invention is installed at a public service station it becomes a sub-station within the larger station and then various stages of handling will be taken care of by attendants using the necessary hose and polishing and wiping equipment (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in expeditiously washing a boat and an outboard motor mounted in normal ready-to-operate position on the stern of said boat, and wherein the boat is supported on a mobile trailer; an individual boat wash station comprising a horizontal stationary driveway of an area such that the boat and trailer may be temporarily parked on and within the confines of the driveway, said driveway having wash-water accumulating and draining facilities underlying the trailer and boat, said accumulating and draining facilities comprising a lengthwise gutter which collects and channels the drain water, a trap at the discharge end of the gutter communicatively connected with a used water drain-away pipe, and means on the driveway at the rear of the trailer and boat for washing the outboard motor, said means comprising an adjustable tank in which water is contained, said tank being movable toward and from said trap, said tank having water supply and discharge lines operatively connected thereto and being suspended adjustably from a stationary support.

2. The structure defined in claim 1, and wherein said support comprises a perpendicular swivelly mounted post having an arm lateral thereto and adapted to swing in a plane parallel to the plane of the driveway, said tank supported on said arm and said arm being vertically adjustable.

3. A boat wash station comprising, in combination, a horizontal foundation of sufficient length and width to enable a user thereof to park an automobile and an attached trailer with a boat on said foundation, said foundation comprising a driveway open at the ends to permit an approach to the service area from either end and having a lengthwise gutter for channeling wash water, and being provided at one end with a pit connected with a drainage pipe and communicable with the adjacent end of the gutter, a crane to one side of one end portion of said foundation embodying a swivelly mounted post, a horizontal frame mounted on the post to turn therewith and adjustably mounted to be raised and lowered, said frame being provided at a free swingable end with a flush tank said flush tank being provided with supply and return lines, said post having guide tracks and said frame having roller-equipped plates operable in the guide tracks, and power means mounted atop the post and connected by a reelable cable to a power driven reel.

References Cited in the file of this patent

UNITED STATES PATENTS

| | | |
|---|---|---|
| 1,934,019 | Thew | Nov. 7, 1933 |
| 2,646,807 | Martin | July 28, 1953 |
| 2,716,772 | Cockrell | Sept. 6, 1955 |